3,522,202
RELEASE COATINGS CONSISTING OF THREE
POLYORGANOSILOXANES
Tadashi Wada, Kunio Ito, and Masaki Kameya, Gunma-ken, Japan, assignors to The Shin-Etsu Chemical Industry Co., Ltd., Tokyo, Japan
No Drawing. Filed Sept. 1, 1967, Ser. No. 664,926
Claims priority, application Japan, Sept. 12, 1966, 41/60,285
Int. Cl. C08g 47/00, 51/34
U.S. Cl. 260—33.2
4 Claims

ABSTRACT OF THE DISCLOSURE

Film-forming compositions consisting of (a) a methylpolysiloxane containing terminal silicon-bonded hydroxyl groups, (b) a methyl hydrogen polysiloxane and (c) a methylphenylpolysiloxane, containing terminal hydroxyl groups, which are useful in preventing sticky or adherent materials, such as asphalts, solid paraffins and ice, from sticking or adhering to bases such as wrapping paper, polyethylene films, metals and the like.

SUMMARY OF THE INVENTION

This invention is concerned with organopolysiloxane compositions which may be used for preventing adherent bases from sticking to normally adherent matters. As described in U.S. Pats. 2,985,545, 2,985,546 and 3,004,871, it has been known that for the purpose of easily separating or stripping, from the adhesive cargoes contained therein, various wrapping and shipping materials, those materials are to be coated with films essentially consisting of methylpolysiloxane gum, as, for example, in the packing of sticky tapes, in wrapping asphalts with paper, and in preventing some solids, e.g., ice, from adhering to the surface of metals.

However, film formed by the hardening of the compositions, whose essential ingredient is methylpolysiloxane gum, leaves something to be desired in its adherence to the bases: that is to say it is apt to peel off the surfaces of the bases to which it is supposed to adhere permanently by a slight friction, as is shown in the case of polyethylene films, polypropylene fibers and glassine paper, coated with films formed by compositions comprising as their essential ingredient methylpolysiloxane gum. Such a phenomenon is particularly marked when mechanical friction occurs so that compositions consisting mostly of methylpolysiloxane gum do not give the desired effect, when applied to the bases mentioned above. Furthermore, these compositions are apt to undergo a great change in viscosity with the passing of time, and their pot life is short, so that their usefulness is limited to a short time.

Although some attempts have been made to overcome this disadvantage, such as adding glacial acetic acid to the treating solution of the methylpolysiloxane compositions, none of them serve to improve their pot life.

It is an object of the present invention to provide organopolysiloxane compositions which will form films that will not peel off the bases to which they have been applied, and at the same time will show excellent separating properties to the adherent wrapping materials. Another object of the invention is to provide organopolysiloxane compositions which will be stable and undergo comparatively little change in viscosity with the passing of time. The organopolysiloxane compositions provided by the present invention essentially consist of (1) 100 parts by weight of methylpolysiloxane comprising siloxane units having the general formula of $$(CH_3)_aSiO_{\frac{4-a}{2}}$$

where $a$ has an average value of from 1.9 to 2.0, and having terminal hydroxy groups in its molecule, (2) from 0.1 to 7 parts by weight of methyl hydrogen polysiloxane, (3) from 0.5 to 20 parts by weight of phenyl-group-containing polysiloxane having the general formula $$HO\text{\textlbrackdbl}R_2SiO\text{\textrbrackdbl}_nH$$

where R represents methyl and phenyl, of which from 5 to 90 molar percent are phenyl, and $n$ is an integer from 1 to 100, if necessary, a fourth ingredient is present, namely, from 500 to 5000 parts by weight of organic solvents.

Methylpolysiloxane, having terminal hydroxyl groups in its molecule, which is the first component of the compositions of the invention, is well known as an essential raw material of silicone gum and can be readily prepared by hydrolyzing methylchlorosilane by the method known in the art. It contains on the average from 1.9 to 2.0 of methyl groups per silicon atom, and depending on the polymerization degree, it will be in fluid or solid form, the solids being soluble in benzene. The methylpolysiloxane employed in the invention has a viscosity which is preferably higher than 1,000 cs. at 25° C. If the viscosity of the methylpolysiloxane is lower than 1,000 cs., the film of the organopolysiloxane composition will not possess the desired physical strength, and will therefore not serve the purpose of the invention.

The methyl hydrogen polysiloxane, which is the second component, is useful for vulcanizing the compositions of the invention. Any methyl hydrogen polysiloxane may serve the purpose as long as it contains a cyclic compound having, in its molecule, $(CH_3)HSiO$ units, or a linear substance containing said units and terminal trimethyl silyl groups in its molecule. The methyl hydrogen polysiloxane is added to methylpolysiloxane in an amount of from 0.1 to 7 parts by weight of methyl hydrogen polysiloxane per 100 parts of methylpolysiloxane. If the amount of the methyl hydrogen polysiloxane is less than 0.1 part, the compositions of the invention will not develop a hardening effect, on the other hand, if it is more than 7 parts, the separating capacity of the film formed by the compositions will be insufficient thus failing to fulfill the purpose of the invention.

As to the polysiloxane, which is the third component of the compositions of the invention, it has the general formula $HO\text{\textlbrackdbl}R_2SiO\text{\textrbrackdbl}_nH$, where R represents methyl and phenyl in which from 5 to 90 percent must be phenyl. This has been established based on the experimental observations that if more or less phenyl is present, the film formed will give poor adherence or tack to the base. The third component includes methyl-phenyl-polysiloxane having at least two siloxane units selected from groups consisting of the diphenylsiloxane unit $\text{\textlbrackdbl}C_6H_5)_2SiO\text{\textrbrackdbl}$, dimethyl siloxane unit $\text{\textlbrackdbl}(CH_3)_2SiO\text{\textrbrackdbl}$ and methyl phenyl siloxane unit $\text{\textlbrackdbl}(CH_3C_6H_5)SiO\text{\textrbrackdbl}$ or it may consist entirely of methyl phenylsiloxane units; $n$ is preferably in the range from 1 to 100, in order to exhibit the required effect of the compositions of the invention. From 0.5 to 20 parts by weight of the third component is to be added per 100 parts in weight of the first component, because, if the amount of the third component employed is greater or smaller than from 0.5 to 20 parts, the film formed of the compositions will develop poor adherence or tack to the base, furthermore, if the amount is greater than 20 parts, a longer time will be required for the film to be formed, and the film itself, when formed, will show lack of plasticity and become brittle.

The compositions of the invention can be prepared by intimately mixing the above given three components, and, if necessary, some organic solvent; if further needed, some known hardening catalyst such as (a) metal carboxylates (or metal salts of carboxylic acid) including dibutyl tin diacetate, 2-ethyl lead hexoate, dibutyltin di-2-ethylhexoate, and manganese octoate and (b) amines including ethylene diamine and hexyl amine may be added. When such hardening agents are employed, the hardening reaction will be carried out at a lower temperature than in their absence, so that the use of these agents will be advantageous when the compositions of the invention are applied to the bases which cannot stand elevated temperatures, e.g., paper, synthetic fibers, thermally softening plastics, and the like. In order to apply the compositions of the invention to the bases, any methods known in the art may be employed, viz brushing, spraying, roller-coating, impregnation by dipping, and the like. The kinds and the amounts of the organic solvents which are the fourth component of the compositions of the invention should be selected by considering the processability to be imparted to the compositions. Representative examples of such solvents include aromatic hydrocarbons, such as benzene, toluene, and xylene, and inert solvents, such as aliphatic hydrocarbons, hydrocarbon halides, including perchloroethylene, trichloroethylene and chlorobenzene, and ethers, such as diethyl ether and dibutyl ether.

When the compositions of the invention are applied to the various bases, films will be formed over them by simply heating the treated bases. Paper, natural and synthetic fibers, plastics, ceramics and metals such as aluminum, magnesium, copper, iron and zinc may be successfully coated with the films given by the compositions of the invention, and in any of the cases, the films thus formed over the bases will assume an excellent adherence to the bases and at the same time very good separation from adhesive materials. Furthermore, said compositions, comprising, as their third component, siloxane, containing phenyl groups, are very stable and their viscosities undergo little change with the passing of time, so that they have the advantage of remaining useful without any time limit for their application.

Some examples of carrying out the invention will be given below, wherein phenyl-group-containing siloxane, which is the third component of the compositions of the invention, employed in Example 1 was prepared in accordance with the following reference example, all parts given in the examples are by weight.

REFERENCE EXAMPLE

A mixture of 150 parts of toluene and 1000 parts of water was maintained at 50 to 60° C., and within 15 minutes 500 parts of mixed silanes consisting of 20 molar percent of $(C_6H_5)_2SiCl_2$ and 80 molar percent of $$(CH_3)_2SiCl_2$$

were added thereto; the mixture was then heated for 15 minutes at 80° C., whereby the oil layer and water layer became separated. To the oil layer thus obtained were added 500 parts of pure water, 35 parts of sodium carbonate and 50 parts of methanol and the mixture was subjected to agitation for 1 hour at room temperature. Then the oil layer was withdrawn, rinsed with diluted hydrochloric acid, neutralized, and dried, whereby an ethanol-soluble siloxane polymer was obtained, containing 2.35 percent by weight of hydroxyl groups, and having a viscosity of 174 cs. (at 25° C.) and a refractive index of 1.4925 (at 25° C.).

EXAMPLE 1

97 parts of dimethylpolysiloxane gum having terminal OH groups and 3 parts of methyl hydrogen polysiloxane having terminal trimethyl silyl groups were dissolved in 900 parts of toluene and to the solution was added siloxane, obtained by the method of the reference example, in various amounts as given in Table 1, then, dibutyl tin di-2-ethylhexoate was further added to a mixture in an amount of 6 percent based on the total siloxane, to obtain the treating solution. The treating solution was applied by roller-coating to the surface of polyethylene-laminated craft paper in the amount of 0.8 g./m.$^2$ and heated for 2 minutes at 120° C. so as to form films. 6 inches of Scotch Tape No. 28 (supplied by Minnesota Mining Co., 1 inch in width) and of Kikusui Craft Tape (supplied by Kikusui Tape Mfg. Co., 1 inch in width) were applied to the surface of the treated craft paper which were then subjected to a pressure of 20 g./cm.$^2$ for 20 hours at 70° C., and allowed to stand for 24 hours at 25° C. and 50 percent humidity. The samples thus prepared were subjected to the release test at the velocity of 30 cm./min. by a TKK lightweight release tester in accordance with ASTM D–90349. Another experiment was conducted on the treated craft paper to which had been applied the two kinds of tapes, by rubbing it 100 times with a surgical gauze (density: 32 x 32/inch) under the weight of 100 g./cm.$^2$. The samples thus prepared were also subjected to the release test. The results are given in Table 1. Table 2 shows the change in viscosity of the treating solutions with the passing of time, proving that the presence of the 3rd component successfully prevented the great change in viscosity of the solution observed in its absence.

Next the treating solution was applied to various bases given in Table 3 at the rate of 0.8 g./m.$^2$, and after films had been formed over the surfaces of the bases, said surfaces were strongly rubbed by hand so as to test the degree of tack or adhesion of the films to the bases. Results obtained are given in Table 3.

TABLE 1

| Sample No. | Siloxane [1]: Dimethyl-polysiloxane [2] (Weight percent) | Gum Release, g./in. | | Release, g./in. (After rubbing) | |
|---|---|---|---|---|---|
| | | Scotch Tape | Kikusui Tape | Scotch Tape | Kikusui Tape |
| 1 | 0 | 20 | 3 | [3] | [3] |
| 2 | 0.2 | 18 | 3 | [4] | [4] |
| 3 | 0.5 | 12 | 2.5 | 15 | 3.0 |
| 4 | 1.0 | 10 | 2.0 | 10 | 2.0 |
| 5 | 2.0 | 10 | 2.0 | 10 | 2.5 |

[1] 3rd component.
[2] 1st component.
[3] Adhesion.
[4] Over 150.

TABLE 2

| | Viscosity change (cs.) | | |
|---|---|---|---|
| Sample No. | After 1 hour | After 5 hours | After 24 hours |
| 1 | 229 | 718 | 1,630 |
| 2 | 152 | 321 | 520 |
| 3 | 116 | 173 | 294 |
| 4 | 97 | 129 | 188 |
| 5 | 85 | 100 | 126 |

TABLE 3.—DEGREE OF ADHESION OF FILM TO BASE

| Sample No. | 3rd component: 1st component (weight percent) | Polyethylene-laminated paper | Aluminum foil | Polyester film | Polypropylene cloth | Nylon cloth with cotton blended |
|---|---|---|---|---|---|---|
| 1 | 0 | X | X | Δ | X | X |
| 2 | 0.2 | X | O | O | X | O |
| 3 | 0.5 | O | O | O | Δ | O |
| 4 | 1.0 | O | O | O | O | O |

Remarks: X=Very poor tack; Δ=Medium tack; O=Very good tack.

EXAMPLE 2

95 parts of dimethylpolysiloxane oil (50,000 cs. at 25° C.) having terminal hydroxyl groups and 5 parts of methyl hydrogen siloxane having terminal trimethyl silyl groups were dissolved in 400 parts of xylene and to the solution siloxane was added consisting of 40 molar percent of $(C_6H_5)_2SiO$ and 60 molar percent of $(CH_3)_2SiO$ units, prepared by the method given in the reference example, in various ratios as given in Table 4. To the solution thus prepared dibutyl tin diacetate was further added in the amount of 4 percent by weight of dibutyl tin diacetate based on the total siloxane, and the treating solution thus obtained was applied to glassine paper at the rate of 1.2 g./m.² The treated glassine paper was subjected to thermal treatment for 1 minute at 150° C. Subsequently, the releases test was conducted on the treated surfaces of said glassine paper, employing Scotch Tape as described in Example 1. The results are given in Table 4.

TABLE 4

| Sample No. | Siloxane[1]:Dimethyl-polysiloxane oil[2] (Weight percent) | Release (g./in.) | Release (g./in.) after rubbing |
|---|---|---|---|
| 6 | 0 | 40 | ([3]) |
| 7 | 0.5 | 25 | 120 |
| 8 | 1.0 | 25 | 26 |

[1] 3rd component.
[2] 1st component.
[3] Over 500.

EXAMPLE 3

In this example, a treating solution prepared similar to the one of Example 2 was employed, except that the siloxane (the third component) had been obtained by hydrolyzing $(C_6H_5)(CH_3)SiCl_2$. The solution was applied at the rate of 0.8 g./m.² to various bases given in Table 3, and after films were formed thereon, the surfaces of the films were subjected to strong abrasion by rubbing by hand. The results proved that when the amount of the third component was greater than 0.5 percent by weight, tack of the films was very good. The same samples showed no change in releasing properties even after they were subjected to the abrasion described in Example 1.

What is claimed is:

1. Organopolysiloxane compositions consisting of the following components:
   (1) 100 parts by weight of methylpolysiloxane comprising siloxane units having the general formula of

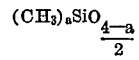

where $a$ has an average value of from 1.9 to 2.0, and containing terminal hydroxyl groups in its molecule;
   (2) from 0.1 to 7 parts by weight of methyl hydrogen polysiloxane, and
   (3) from 0.5 to 20 parts by weight of phenyl-group-containing polysiloxane having the general formula $HO\text{-}[R_2SiO]_n\text{-}H$, where R is methyl and phenyl, of which from 5 to 90 molar percent is phenyl, and $n$ is an integer from 1 to 100.

2. Compositions claimed in claim 1, where phenyl-group-containing polysiloxan is methyl phenyl polysiloxane having at least two siloxane units selected from groups consisting of the diphenyl siloxane unit $\text{-}[(C_6H_5)_2SiO]\text{-}$, the dimethyl siloxane unit $\text{-}[(CH_3)_2SiO]\text{-}$ and the methyl phenyl siloxane unit $\text{-}[(CH_3C_6H_5)SiO]\text{-}$.

3. Compositions claimed in claim 1, which comprise in addition as a fourth component from 500 to 5000 parts by weight of an organic solvent.

4. Compositions claimed in claim 1, wherein the phenyl-group-containing polysiloxane is the compound consisting entirely of methyl phenyl siloxane units.

References Cited

UNITED STATES PATENTS

| 2,739,197 | 5/1957 | Brown | 260—825 X |
| 2,985,545 | 5/1961 | Leavitt | 260—825 X |
| 3,004,871 | 10/1961 | Leavitt | 260—825 X |

MORRIS LIEBMAN, Primary Examiner

L. T. JACOBS, Assistant Examiner

U.S. Cl. X.R.

260—33.6, 33.8, 825